United States Patent [19]
Woods et al.

[11] Patent Number: 5,184,925
[45] Date of Patent: Feb. 9, 1993

[54] INSERT AND INSERT SUPPORT BAR

[75] Inventors: Gerald L. Woods, Bedford; Steven D. Shirk, New Enterprise, both of Pa.

[73] Assignee: Kennametal Inc., Latrobe, Pa.

[21] Appl. No.: 819,427

[22] Filed: Jan. 10, 1992

[51] Int. Cl.⁵ .................. E21B 10/58; B23B 51/00
[52] U.S. Cl. .................. 408/144; 175/432; 408/231; 408/713
[58] Field of Search ............ 408/144, 145, 199, 227, 408/229, 231, 713; 175/420.1, 428, 432, 435

[56] References Cited

U.S. PATENT DOCUMENTS

| | | | |
|---|---|---|---|
| 2,635,856 | 4/1953 | Scheffer | 255/69 |
| 3,049,033 | 8/1962 | Benjamin et al. | 77/68 |
| 3,807,515 | 4/1974 | Evans | 175/410 |
| 4,047,830 | 9/1977 | Kruger | 408/144 X |
| 4,190,125 | 2/1980 | Emmerich et al. | 175/410 |
| 4,342,368 | 8/1982 | Denman | 175/410 |
| 4,356,873 | 11/1982 | Dziak | 408/145 X |
| 4,492,278 | 1/1985 | Leighton | 175/410 |
| 4,503,920 | 3/1985 | Clement | 175/394 |
| 4,595,322 | 6/1986 | Clement | 408/230 |
| 4,633,959 | 1/1987 | Knox | 175/410 |
| 4,817,742 | 4/1989 | Whysong | 175/420.1 |
| 4,817,743 | 4/1989 | Greenfield et al. | 175/435 |
| 4,821,819 | 4/1989 | Whysong | 175/410 |

Primary Examiner—Steven C. Bishop
Attorney, Agent, or Firm—Larry R. Meenan; James G. Porcelli

[57] ABSTRACT

A center vacuum rotary drill bit including a drill bit body having a top working surface. Formed within the top working surface is a slot having disposed therein an insert positioned within a shim within the slot. The insert includes a pair of oppositely facing generally parallel side surfaces, a pair of oppositely facing generally parallel end surfaces extending between and interconnecting said side surfaces, a pair of oppositely inclined top surfaces extending between and interconnecting said side and end pairs of surfaces, and a bottom surface having a concave depression formed therein. The bottom surface extends transversely to and interconnects the side and end pairs of surfaces. A support bar including a convex top surface is disposed within the slot between the insert bottom surface and the slot such that the convex top surface supports the concave depression of the insert. In a preferred embodiment, the modulus of elasticity of the support bar is greater than the modulus of elasticity of the shim.

6 Claims, 3 Drawing Sheets

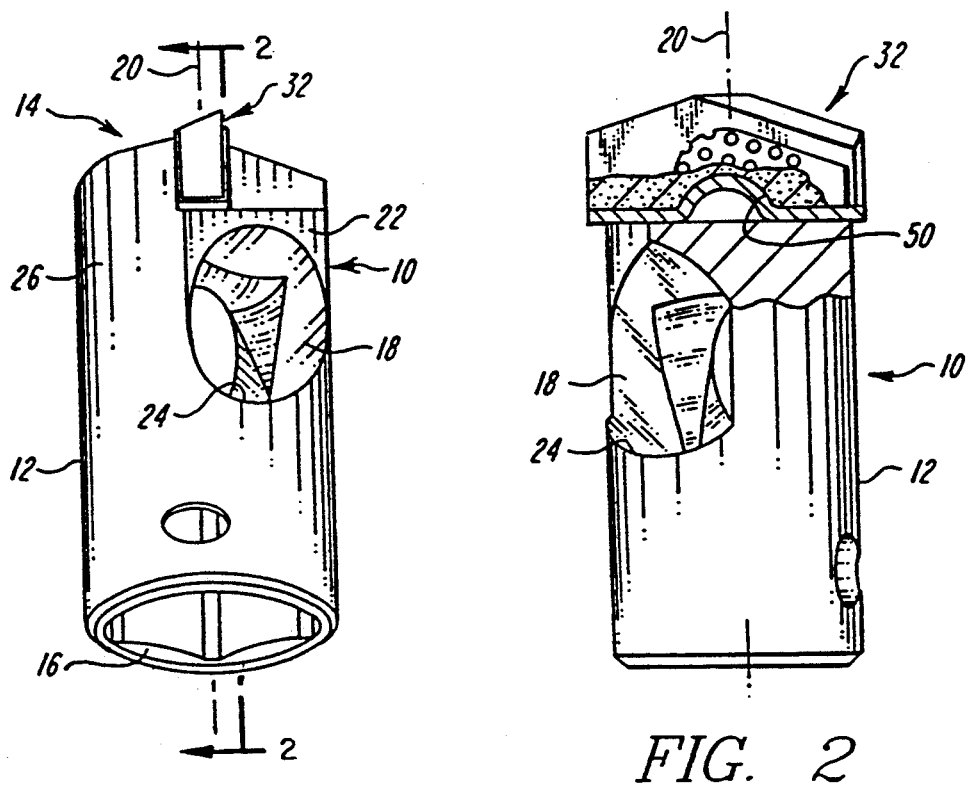
FIG. 1
FIG. 2
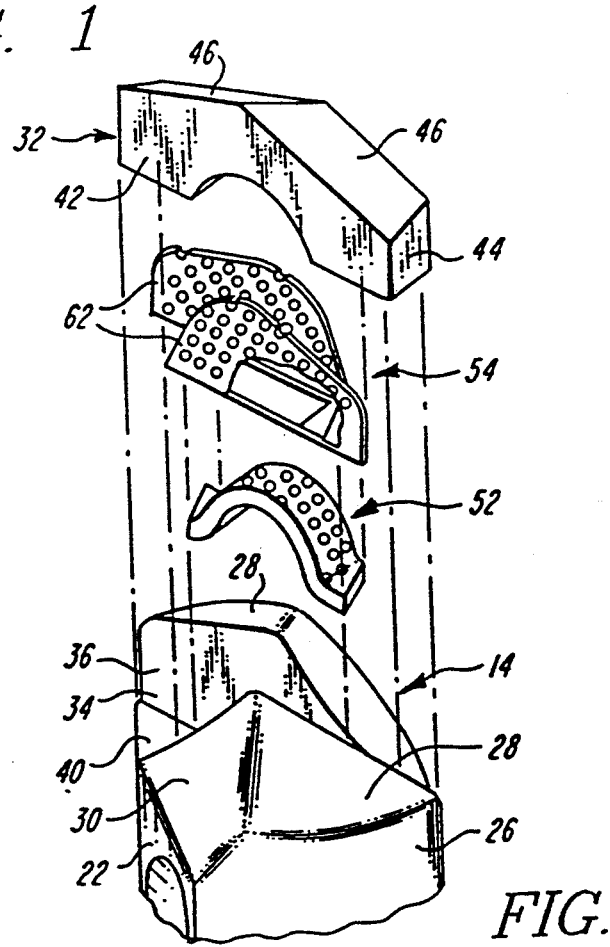
FIG. 5

INSERT AND INSERT SUPPORT BAR

CROSS-REFERENCE TO RELATED APPLICATION

This application is related to copending U.S. patent application No. 07/819,423, filed Jan. 10, 1992, entitled "INSERT SPACER ASSEMBLY," by Woods et al.

1. Field of the Invention

This invention relates to an insert and insert support bar for use in a center vacuum rotary drill bit. More particularly, this invention relates to an insert having a concave depression and an insert support bar for supporting the insert within a slot formed within a top working surface of a center vacuum rotary drill bit.

2. Background of the Invention

A hard wear resistant insert for use in a center vacuum rotary drill bit is typically formed of cemented tungsten carbide and is secured by brazing the insert in a shim within a slot formed within a top working surface of the drill bit body. The shim may be composed of a malleable metal, such as copper, and acts to relieve the braze strain between the hard wear resistant insert and the steel rotary drill bit body.

The hard wear resistant insert used in the rotary drill bit is typically an "A" frame house style tungsten carbide insert having a pair of oppositely facing generally parallel side surfaces and a pair of oppositely facing generally parallel end surfaces. A pair of adjacent oppositely inclined top surfaces extend between and interconnect the side and end pairs of surfaces and a horizontal bottom surface extends transversely to and interconnects the side and end pairs of surfaces. The horizontal insert bottom surface is generally rectangular in shape and is sized relative to the dimensions of the bit body slot to allow the insert bottom surface to firmly rest upon the bottom surface of the shim and slot such that the downward axial force encountered by the insert is transferred to the drill bit body during drilling.

It is well known that only the portion of the insert which projects above the top working surface of the drill bit is utilized in the drilling operation. Accordingly, because a portion of the insert is secured below the top working surface of the drill bit and not involved in the drilling operation, it is desirable to reduce the amount of material forming the insert which is not involved in the drilling operation thereby reducing the cost of the insert.

One method of reducing the amount of material which forms the insert and is not involved in the drilling operation is to incorporate a chevron into the bottom of the insert. Inserts having a chevron bottom surface are less than satisfactory because the chevron weakens the insert and concentrates the stress at a central location such that during use the insert has a tendency to fracture from the axial force applied during drilling.

Another method of reducing the amount of material forming the insert is to reduce both the depth of the slot and the height of the insert. Reduction of the insert height and slot depth has also proven less than satisfactory because, in many instances, the strength of the braze joint between the insert and the drill bit body is weakened because of the reduced surface area between the insert and the slot resulting in an increased stress load.

Accordingly, one object of the present invention is to provide an insert which is made of less material than previously known inserts and may be used in most any slot.

Yet another object of the present invention is to provide an insert having a concave depression and an insert support bar having a convex surface which is simple and economical to manufacture.

The present invention is directed to a novel insert made of less material than prior inserts typically secured within comparable insert slots and an insert support bar having a convex surface for providing structural support to the insert during use. The insert has a bottom surface including a concave depression. The insert bottom surface is reinforced by an insert support bar having a convex surface to match the concave depression. The convex surface reinforces the insert thereby reducing flexing of the insert under a downward axial load.

SUMMARY OF THE INVENTION

Briefly, according to this invention there is provided a center vacuum rotary drill bit including a drill bit body having a top working surface. Formed within the top working surface is a slot having disposed therein an insert positioned within a shim within the slot. The insert includes a pair of oppositely facing generally parallel side surfaces, a pair of oppositely facing generally parallel end surfaces extending between and interconnecting said side surfaces, a pair of oppositely inclined top surfaces extending between and interconnecting said side and end pairs of surfaces, and a bottom surface having a concave depression formed therein. The bottom surface extends transversely to and interconnects the side and end pairs of surfaces. The rotary drill bit also includes a support bar having a convex top surface. The support bar is disposed within the slot between the insert bottom surface and the slot such that the convex top surface supports the concave depression of the insert.

In a preferred embodiment, the modulus of elasticity of the support bar is greater than the modulus of elasticity of the shim.

BRIEF DESCRIPTION OF THE DRAWINGS

Further features and other aspects and advantages of this invention will become clear from the following detailed description made with reference to the drawings in which:

FIG. 1 is a perspective view of a center vacuum rotary drill bit including an insert, shim and support bar in accordance with the present invention;

FIG. 2 is a cross-sectional view of the center vacuum rotary drill bit of FIG. 1 taken along line II—II;

FIG. 5 is an exploded fragmentary view of the drill bit, support bar, shim and insert of FIG. 1;

DESCRIPTION OF THE PREFERRED EMBODIMENT

Figure 3:
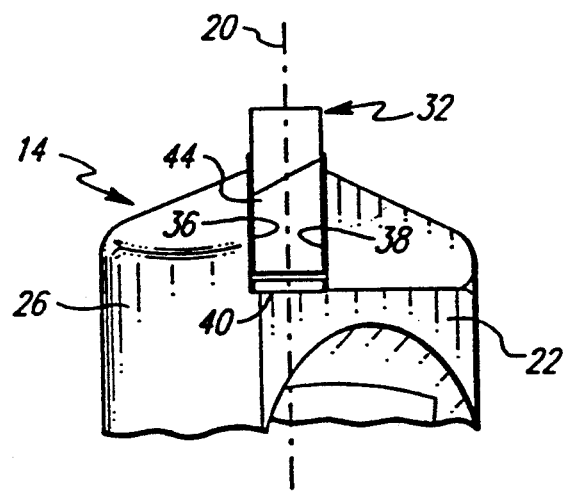
FIG. 3 is an exploded fragmentary perspective view of a center vacuum rotary drill bit, support bar, shim and insert of the present invention.

In the following description like reference characters designate like or corresponding parts. Also in the following description it is to be understood that such terms as forward, rearward, left, right, upwardly, downwardly and alike are words of convenience and are not to be construed as limiting terms.

Referring now to FIGS. 1, 2, 3 and 5, there is shown a center vacuum rotary drill bit 10 including an elongated cylindrical body 12 having a top working surface 14. Extending upwardly through one end of the drill bit body 12 is an interior axial bore 16 of hexagonal cross sectional shape.

The body 12 includes a pair of opposing dust collection openings 1 angularly positioned with respect to a central vertical axis 20 of the drill bit body. The dust collection openings 18 are disposed within recessed, generally inverted, C-shaped planar side surfaces 22. As shown in FIG. 1, the openings 18 and recessed planar side surfaces 22 cooperatively provide a pair of oppositely disposed, generally transverse arcuate shaped shoulder portions 24. The shoulder portions 24 are positioned at the juncture of the lower marginal edges of the respective openings 18 and planar side surfaces 22.

The body 12 also includes a pair of oppositely disposed, upstanding members 26 which are made integral with and support the top working surface 14. The members 26 are generally arcuate in cross section and disposed in vertical planes which extend generally transverse to the planes containing the associated openings 18.

The top working surface 14 of the drill bit body 12 has an irregular surface configuration defined by an alternating first pair of oppositely disposed tapered heel surfaces 28 and a second pair of oppositely disposed tapered compression surfaces 30. The tapered heel surfaces 28 and compression surfaces 30 of the top working surface 14 of the drill bit body 12 cooperatively allow drill dust and the like to flow into the dust collection openings 18 and through axial bore 16.

As best illustrated in FIGS. 3 and 5, the tapered heel surfaces 28 are positioned on opposite sides of a vertical plane that passes through the vertical central axis 20 of the drill bit body 12. The tapered heel surfaces 28 are slightly convex conical and extend downwardly and outwardly in a direction away from the vertical central axis 20 of the drill bit body 12 and provide a backup or support for an insert 32.

The tapered compression surfaces 30 are disposed on opposite sides of the vertical plane as described above such that one of the surfaces of each pair are disposed on the same side of the plane so as to merge into apex edges which lie in substantially the same general plane on opposed sides of the insert. The tapered compression surfaces 30 are of a substantially pie shape and extend downwardly and outwardly away from the top of the working surface 14 of the drill bit body 12 toward the openings 18.

The tapered compression surfaces 30 are preferably disposed at a greater angle of inclination than that of the tapered heel surfaces 28. The lower edge of each of the compression surfaces 30 abuts with the planar vertical side surface which together cooperatively act as a conduit for dust and the like to flow to the openings 18.

The dust collecting openings 18 are disposed below the tapered compression surfaces 30. The openings 18 are vertically spaced from the top working surface 14 by a predetermined distance such that dust and the like flows from the tapered compression surfaces 30, past the side surfaces 22 and into the dust collection openings 18.

As shown in FIGS. 1, 3 and 5, the multiple alternating heel 28 and compression surfaces 30 of the drill bit together define a transversely extending slot 34 to receive an insert 32. The slot 34 shown in FIGS. 1, 3 and 5, includes a first sidewall 36 and an opposite second sidewall 38 joined at the bottom edge thereof by a bottom surface 40. The bottom surface 40 may be generally horizontal or the bottom surface may include a convex depression. Preferably, the sidewalls 36 and 38 of the slot 34 are parallel to the vertical central axis 20 of the drill bit body 12.

The insert 32 secured within the slot 34 may be of a type having a plate-like configuration and made of a high strength, wear-resistant material such as cemented tungsten carbide or the like. As shown in FIGS. 1-3, 5, 11 and 12, the insert 32 is an "A" frame house style tungsten carbide insert having a pair of oppositely facing generally parallel side surfaces 42 and a pair of oppositely facing generally parallel end surfaces 44. A pair of adjacent oppositely inclined top surfaces 46 extend between and interconnect the side and end pairs of surfaces 42 and 44 and a bottom surface 48 extends transversely to and interconnects the side and end pairs of surfaces. The insert bottom surface 48 is of a generally rectangular shape and is sized relative to the bit body slot 34 to fit within the slot in closely spaced relation to the corresponding inner side walls 36 and 38 and bottom surface 40 of the slot.

In accordance with the present invention, the insert bottom surface 48 includes a concave depression 50. It is believed that a concave depression 50 distributes an applied axial force during cutting or drilling by the bit 10 thereby preventing fracture of the insert 32. The concave depression 50 may be semi-circular, semi-oval or the like. It will be appreciated that the design of the concave depression 50 must be such as to (1) minimize the effect of the axial load on the insert 32 by avoiding sharp corners which tend to amplify nominal stress, and (2) to provide an insert of a proper carbide density after pressing.

Figures 11, 12:
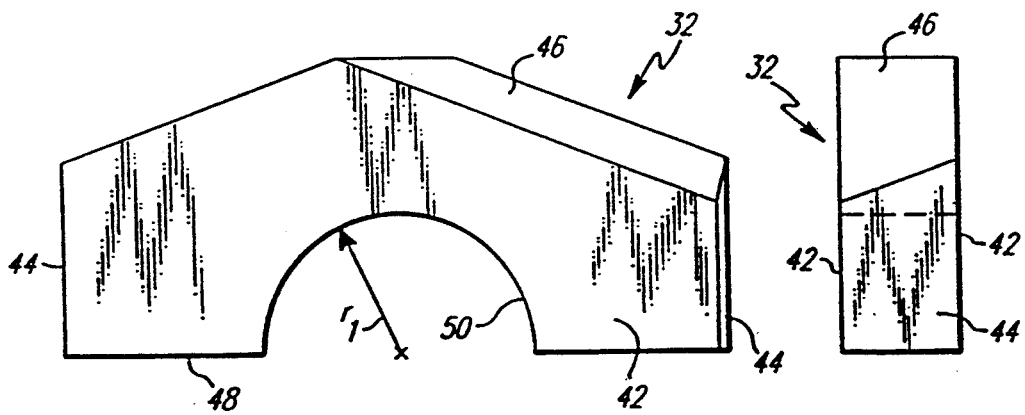
FIG. 11 is a front view of an insert having a concave depression formed in the bottom surface thereof.
FIG. 12 is an end view of the insert of FIG. 11.

As shown in FIGS. 5 and 11, the concave depression 50 is semi-circular shaped having a central axis perpendicular to the parallel side surfaces 42 of the insert. In another embodiment, the central axis of the concave depression 50 may be positioned at an oblique angle with respect to the parallel side surfaces 42 of the insert. The concave depression 50 is aligned such that when the insert 32 is positioned within the slot the concave depression is concealed behind the sidewalls.

The radius $r_1$ of the semi-circular concave depression 50 may vary with the insert diameter and the distance between the top of the insert and periphery of the concave depression. For example, an insert of approximately 1 inch diameter may have a radius of approximately 0.22 inches, an insert of approximately 1⅜ inch diameter may have a radius of approximately 0.29 inches and an insert of approximately 1½ inch diameter may have a radius of approximately 0.30 inches. In each example, the radius increases approximately 5% for each ⅛ inch increase in insert diameter.

In accordance with the present invention, as shown in FIGS. 2 and 3, disposed between the bottom surface 48 of the insert and the bottom surface 40 of the slot 34 is an insert support bar 52 and shim 54.

The shim 54 is illustrated as having a pair of upstanding spaced side walls 56 and a bottom wall 58. The bottom wall 58 extends in transverse relation between and integrally interconnects the side walls 56 so as to dispose them between and adjacent respective spaced sidewalls 36 and 38 of the bit body slot 34. The side walls 56 and bottom wall 58 of the shim 54 are preferably formed from a one-piece, thin sheet of malleable metallic material such as copper. Perforations may be punched through the side and bottom walls 56 and 58 generally across the mid-section region of the shim 54, or across the entire shim in an array of multiple rows and columns.

Figure 6:
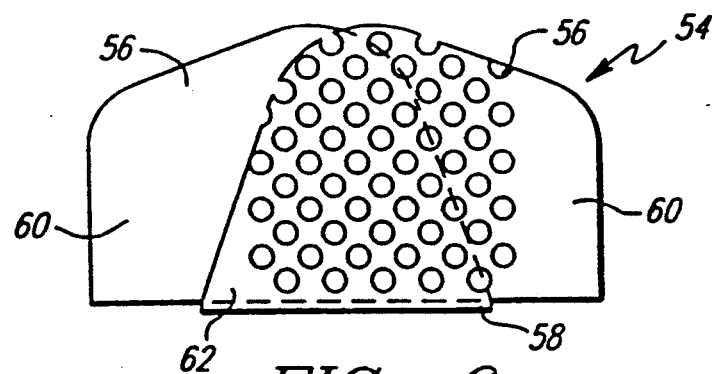
FIG. 6 is a front view of the shim of FIG. 5.
Figure 7:
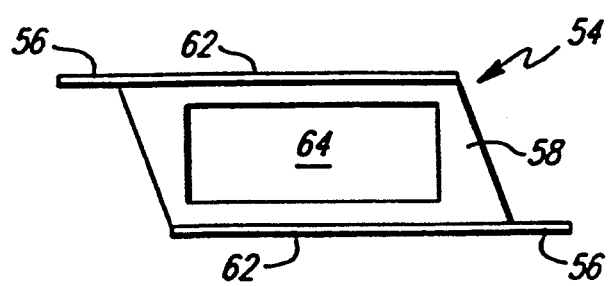
FIG. 7 is a top view of the shim of FIG. 6.
Figure 9:
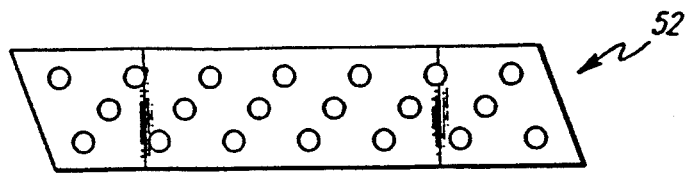
FIG. 9 is a top view of the support bar of FIG. 8.
Figure 8:
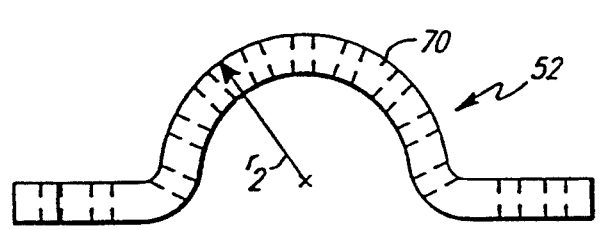
FIG. 8 is a front view of the support bar of FIG. 5.
Figure 10:
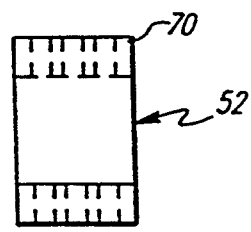
FIG. 10 is an end view of the support bar of FIG. 8.

The shim side walls 56 each have respective forward and rearward portions 60 and 62. The shim bottom wall 58 interconnects and aligns the side walls 56 such that the side walls are disposed in an off-set, side-by-side, spaced apart relationship with respect to one another, being overlapped at their respective rearward portions 62 and extending in opposite directions at their respective forward portions 60. As shown in FIGS. 6 and 7, the bottom wall 58 is of a generally flat configuration having an opening 64 formed therein, or, in accordance with another embodiment of the present invention, the bottom wall 58 may be of a continuous metallic material. For a more detailed discussion of a shim, reference is made to U.S. Pat. Nos. 4,817,742 and 4,817,743, assigned to Kennametal Inc.

As shown in FIGS. 5 and 8-10, the support bar 52 is of a generally rectangular shape having a convex top surface 70 of a radius $r_2$ matching the radius $r_1$ of the concave depression 50. Perforations may be punched through the support bar 52 in an array of multiple rows and columns. The support bar 52 may be formed from most any suitable material such as steel (SAE 1020), ceramic material or the like. In a preferred embodiment the support bar 54 has a modulus of elasticity greater than the material forming the shim 54. It will be appreciated that the synergistic combination of a shim formed of a malleable material to relieve braze strain and a support bar 52 having a modulus of elasticity greater than the shim to efficiently distribute an applied axial load into the drill bit and absorb the load resulting in less stress and deformation in the insert 32 allows for the reduction of the amount of material forming the insert to reduce fracture of the insert during use.

Figure 4:
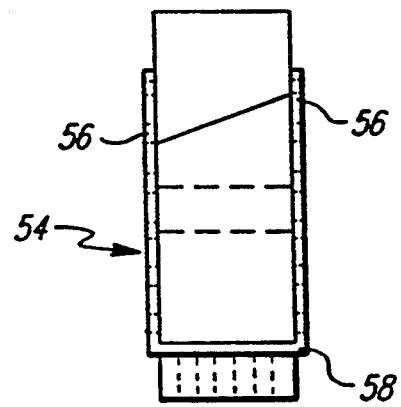
FIG. 4 is an enlarged end view of a support bar, shim and insert of the present invention.

The thickness of the support bar 52 may be varied as desired to support the insert 32 above the bottom surface of the slot 34. As shown in FIGS. 4 and 5, the shim 54 is positioned over the convex top surface 70 of the support bar 52 such that the convex top surface extends through the opening 64 formed within the bottom wall 58 of the shim 54 as substantially flat ends 72 of the support bar elevate the shim 54 within the slot 34. In an alternative embodiment, the support bar 52 may also be positioned on top of the shim 54. It will be appreciated that although the support bar 52 and shim 54 as described herein are formed as separate articles to facilitate braze flow under the insert, a similar function may be achieved by forming the insert support bar and shim as one unit or forming the support bar as an integral part of the slot of a drill bit 10.

The support bar 52, shim 54 and insert 32 are secured within the slot 34 formed within the tool by brazing. In forming a braze joint, a solid bar braze alloy (not shown) may be placed under the shim 54 and insert support bar 52. The braze alloy is then induction heated causing the braze to flow up through and around the support bar 52 and side walls 56 of the shim 54 by capillary action thereby securing the insert 32 within the slot 34 of the tool.

The documents, patents and patent applications referred to herein are hereby incorporated by reference.

Having described presently preferred embodiments of the invention is to be understood that it may be otherwise embodied within the scope of the appended claims.

What is claimed is:

1. A center vacuum rotary drill bit comprising:
    a rotary drill bit body having a top working surface including a slot extending transversely across said top working surface, said slot including a first sidewall, an opposite second sidewall and a generally horizontal bottom surface extending between said first sidewall and said second sidewall;
    an insert positioned within a shim within said slot, said insert including a pair of oppositely facing generally parallel side surfaces, a pair of opposite facing generally parallel end surfaces extending between and interconnecting said side surfaces, a pair of oppositely inclined top surfaces extending between and interconnecting said side and end pairs of surfaces, and a bottom surface having a concave depression formed therein, said bottom surface extending transversely to and interconnecting the side and end pairs of surfaces, and
    a support bar including a convex top surface, said support bar disposed within said slot between said insert bottom surface and said slot such that said convex top surface supports said concave depression, wherein the modulus of elasticity of said support bar is greater than the modulus of elasticity of said shim.

2. The drill bit as set forth in claim 1 wherein said support bar is perforated.

3. The drill bit as set forth in claim 2 wherein said shim includes a pair of upstanding spaced sidewalls and a bottom wall, said bottom wall extending in transverse relation between and integrally connecting said sidewalls.

4. The drill bit as set forth in claim 3 wherein said shim is perforated.

5. The drill bit as set forth in claim 4 wherein said bottom wall of said shim includes an opening, said shim is positioned over said support bar such that said convex top surface extends through said opening to support said concave depression.

6. The drill bit as set forth in claim 5 wherein said bottom wall of said shim is of a generally flat parallelpiped configuration having a rectangular opening formed therein.

* * * * *